UNITED STATES PATENT OFFICE.

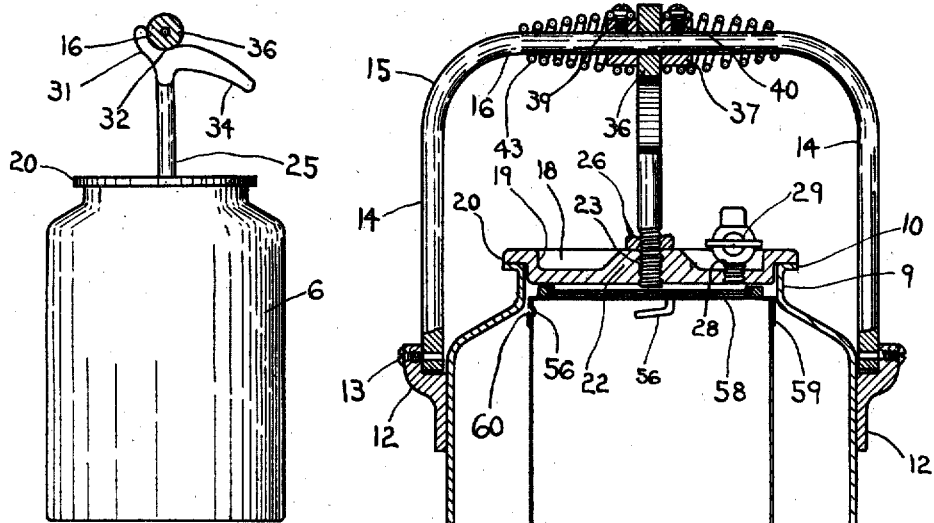

JOHN T. SLOCOMB, OF PROVIDENCE, RHODE ISLAND.

STEAM COOKING VESSEL.

1,384,102.  Specification of Letters Patent.  Patented July 12, 1921.

Application filed June 9, 1920. Serial No. 387,556.

*To all whom it may concern:*

Be it known that I, JOHN T. SLOCOMB, a citizen of the United States, residing at Providence, in the county of Providence and State of Rhode Island, have invented certain new and useful Improvements in Steam Cooking Vessels, of which the following is a specification.

My invention relates to steam cooking vessels of the type in which the steam is not allowed to escape at a low temperature; that is to say a pressure steam cooking vessel. This invention is purposed as an improvement upon the construction set forth in United States Patent No. 1,111,810 issued to me September 29, 1914.

The essential objects of this invention are to cheapen and strengthen the construction, assemblage, and application of the hand holds; to provide in a pressure cooker means whereby foods such as brown bread or beans may be cooked without loss or change of any ingredients thereof whereby the original flavor and moisture are retained; and to afford an instantaneous means for venting an excess steam pressure.

To the above and correlated ends my invention consists in such parts and in such combinations of parts as fall within the scope of the appended claims.

In the accompanying drawings which form a part of this specification—

Figure 1 is a side elevation of my cooker showing the bail in transverse section, and omitting the bail attaching member, Fig. 2, an enlarged central transverse section of the same taken at an angle of ninety degrees from the position shown in Fig. 1, Fig. 3, a plan of the inner receptacle, and Fig. 4, an enlarged plan of the hand holds.

Like reference characters indicate like parts throughout the views.

In the form of my invention herein illustrated an outer vessel 6 comprises a base 7, a cylindrical side 8, a retracted neck 9 terminating in a peripheral flange 10. Welded to opposite portions of the side wall are ears 12 carrying pintles 13 pivotally engaging the arm portions 14 of a resilient bail 15 which includes a handle portion 16. A cover 18 has an annular marginal shoulder 19 terminating in a peripheral flange 20 which rests on the flange 10. The cover has a central boss 22 provided with a threaded opening 23 to receive the threaded lower end of a post 25 carrying a lock nut 26. Threaded in the cover is a valve casing 28 forming a communication between the interior and exterior of the vessel in which is mounted a pet cock 29, the same constituting a safety valve for relieving excessive steam pressure in the vessel. The upper portion of the post 25 is flattened and comprises an upwardly curved finger 31 at one side of a seat 32 at the top of the post, and a lateral downwardly inclined cam finger 34 extending from the opposite side of the seat. Centrally of the bail handle 16 is mounted a roller 36 held against lateral movement thereon by collars 37 on opposite sides thereof. Each collar is provided with lateral threaded openings 39 to receive screws 40 whose lower ends engage the handle and whose upper portions extend above the collars and carry heads 41. These screws tightly secure the collars to the handle 16 and perform a second function about to be set forth. Hand holds 43 of unusual construction are provided, each comprising a series of helical coils 44, embracing the handle and increasing in diameter from the outermost coil 45 to the innermost coil 46. The latter coil embraces its respective collar 37 and is continued to form a curved finger or hook 48 with a laterally bent inclined extremity 49 adapted to engage one of the screws 40 below the head. The bent extremity coöperates with the screw to retain the hand hold. To clamp the cover 18 upon the vessel the roller 36 is pushed to its seat 32 over the cam finger 34.

An inner cylindrical vessel 50 comprises a bottom 51 and a side 52. The former has fixed to its bottom feet 53 which rest on the bottom of the outer vessel. The inner vessel is of less diameter than the outer forming a chamber 54, and the side 52 is provided with a plurality of bayonet slots 56 bent or pressed into the material. A cover is provided comprising a top 58 and a flange 59, the latter being provided with bayonet shoulders 60 adapted to register in the bayonet slots 56. Upon the top 58, which is spaced from the cover 18, are loops 62 in which are pivoted the ends 63 of a bail 64.

The inner vessel 50 is introduced and removed from the outer vessel by means of the bail 64, and the inner vessel is everywhere spaced from the outer vessel to allow the liquid and steam free access to all parts thereof. The bayonet slot engagement makes the inner vessel including its cover portable as a single element, but enables disengagement of the cover when necessary. Thus the inner receptacle is air tight during cooking and no steam is accessible thereto. The contents of the inner receptacle remain intact and no part of the ingredients within said receptacle escape. Applicant is aware that heretofore receptacles for food have been placed within non-pressure boilers or those wherein the steam is not confined, and he therefore makes no claim broadly to such a construction, but what he claims is:

1. In a cooking apparatus, a steam confined outer receptacle, a cover on the receptacle, a post on the cover provided with a seat, a resilient clamping bail on the receptacle supportable in the seat, and an inner receptacle mounted in the outer receptacle and spaced therefrom.

2. In a cooking apparatus, a steam confined outer receptacle, a cover on the receptacle, a post on the cover provided with a seat, a resilient clamping bail on the receptacle supported in the seat, and an inner receptacle comprising a body centrally mounted in the outer receptacle and spaced therefrom, and provided with bayonet depressions upon its margin, a cover embracing the body and provided with bayonet shoulders engaging the depressions, and a bail on the second cover.

3. In a cooking apparatus, a body, a cover on the body, a post on the cover, a cam finger on the post, a resilient bail on the body, a roller on the bail adapted to engage the finger, collars on the bail abutting against the sides of the roller and provided with radial openings, clamping screws in the openings engaging the bail and projecting above the collars, and hand holds upon the bail comprising coils embracing the collars, and hooks provided with laterally inclined extremities engaging the projecting portions of the screws.

In testimony whereof I have affixed my signature.

JOHN T. SLOCOMB.